Aug. 5, 1930.  H. H. GUTTMAN ET AL  1,772,393

SNAP FASTENER

Filed May 1, 1929

WITNESSES

INVENTORS
Herman H. Guttman
Sigmund Guttman
BY
ATTORNEYS

Patented Aug. 5, 1930

1,772,393

UNITED STATES PATENT OFFICE

HERMAN H. GUTTMAN AND SIGMUND GUTTMAN, OF BROOKLYN, NEW YORK

SNAP FASTENER

Application filed May 1, 1929. Serial No. 359,632.

This invention relates to a fastener designed and adapted for detachably fastening or connecting together portions of divers articles, such as garments, straps of garments, belts, or any other articles.

The principal object of the invention is the provision of a fastener of simple and improved construction, which enables its parts to be readily engaged and disengaged, which affords a certain amount of play, and which will be prevented from unintentional disengagement or separation.

The nature of the invention and its distinguishing features and advantages will appear when the following specification is read in connection with the accompanying drawing, in which Figure 1 is a plan view of the fastener showing the parts thereof engaged.

Figure 1:
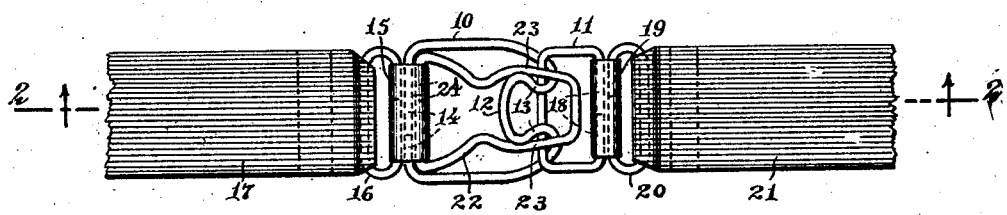
Figure 2:
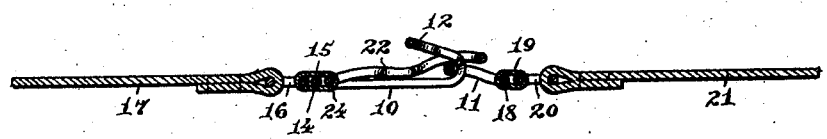
Fig. 2 is a longitudinal sectional view taken on the line 2—2 of Fig. 1.
Figure 3:
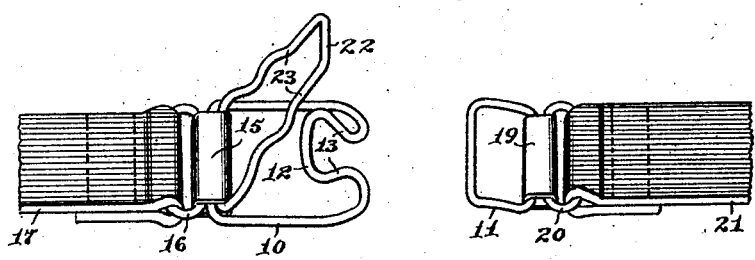
Fig. 3 shows the parts of the fastener separated.

Referring now more particularly to the drawings, it will be apparent that the fastener includes fastening elements 10 and 11. The element 10 is made of a single piece of wire bent upon itself to provide a hook 12 at one end having relatively converging sides 13, while the opposite end of the element by reason of the presented terminals 14 is connected with a tubular member 15. The tubular member 15 has connected therewith a loop 16 which serves for the purpose of attaching the element 10 to the end or edge portion of an article, such as a strap 17.

The element 11 is made of wire bent upon itself into the form of an eye or loop, and by reason of the terminals 18 is connected with a tubular member 19. The tubular member 19 has connected therewith a loop 20 for effecting the attachment of the element 11 to the end of a strap 21, a companion strap of the strap 17. Both of the elements 10 and 11 are allowed to have pivotal movement relative to the tubular members 15 and 19. It will also be apparent that the element 11 may readily be engaged with the hook 12 of the element 10, and also readily disengaged therefrom.

In order to prevent the unintentional disengagement or separation of the element 11 with the hook 12 of the element 10 there is provided means in the form of a keeper or latch element 22. The keeper or latch element 22 is made of wire bent upon itself to provide curved and recurved sides 23, and by reason of the terminals 24 presented, the keeper or latch element 22 is pivotally connected with the tubular member 15. The keeper or latch element 22 may be snapped into engagement with the hook 12, and this is accomplished by reason of the yieldability or flexibility of the sides 13 of the hook 12, and sides 23 of the keeper or latch element 22. When the keeper or latch element 22 is swung to a position in which the sides 23 thereof will be in contact with the sides 13 of the hook 12, by applying pressure to the keeper or latch element 22, the sides 23 thereof will be flexed, and snapped into engagement with the relatively converging sides 13 of the hook. In this manner the element 11 will be prevented from unintentional disengagement from the element 10, when the former is engaged with the hook 12. The keeper or latch element 22 may be unsnapped from engagement with the hook 12 in an obvious manner, thereby permitting the element 11 to be readily disengaged from the element 10.

We claim:

1. A fastener comprising a pair of fastener elements each having attaching means, one of said elements consisting of an eye or loop, and the other of said elements including a hook engageable with said eye or loop, a pivoted keeper on the element having the hook, said hook and keeper having cooperative flexible portions whereby said keeper may be releasably snapped into engagement with said hook, to prevent the unintentional disengagement of said elements, when said hook is engaged with said eye or loop.

2. A fastener comprising a pair of fastener elements each having attaching means, one of said elements consisting of an eye or loop, and the other of said elements including a hook engageable with said eye or loop, said hook having side portions which converge relatively to each other from its bill toward the eye or loop; and a pivoted keeper on the hook having flexible side portions engageable respectively with said converging side portions of the hook by the pivotal movement of the keeper, whereby said keeper is engaged with the hook, to prevent the unintentional disengagement of said elements, when said hook is engaged with said eye or loop.

Signed at borough of Manhattan, in the county of New York and State of New York, this 29th day of April A. D. 1929.

HERMAN H. GUTTMAN.
SIGMUND GUTTMAN.